USOO5749622A

United States Patent [19]
Tseng

[11] Patent Number: 5,749,622
[45] Date of Patent: May 12, 1998

[54] CONTRACTING STRUCTURE ON BICYCLE SEATS

[76] Inventor: Shao-Chien Tseng, No. 130 Sec 2. Yang-Shin Rd., Yang-Mei Taoyuan 326, Taiwan

[21] Appl. No.: 825,146

[22] Filed: Mar. 25, 1997

[51] Int. Cl.$^6$ .................. B60N 2/38; B25G 3/36; B25G 3/18
[52] U.S. Cl. .................. 297/195.1; 403/384; 403/325
[58] Field of Search .................. 403/325, 321, 403/374, 384, 391; 297/195.1, 215.13, 215.14

[56] References Cited

U.S. PATENT DOCUMENTS

| | | | |
|---|---|---|---|
| 431,573 | 7/1890 | Garford | 403/384 X |
| 597,055 | 1/1898 | Devore | 403/384 X |
| 4,502,811 | 3/1985 | Patriarca | 403/391 |
| 4,995,753 | 2/1991 | Shook | 403/391 X |
| 5,190,346 | 3/1993 | Ringle | 403/391 X |

Primary Examiner—Milton Nelson, Jr.
Attorney, Agent, or Firm—Pro-Techtor International

[57] ABSTRACT

A contracting structure for assembling a bicycle seat conveniently and fast, wherein, on a post pipe for the seat is a C shaped lock head in which a screw is provided to control contracting amount, two semi-circular annuli embedded in the inner wall of the lock head hold therebetween a clamper seat on which are two clamping blocks; the blocks have inward and outward bevelled surfaces thereon, the former are subjected to contraction of the annuli, the latter at the two sides of the lock head can be pressed in the normal direction thereto by the seat frames at the bottom of the seat, a spring is received in both blocks having two arciform clamping grooves formed on the outer lateral sides thereof and corresponding respectively by position to two rod grooves on the clamper seat to thereby form two clamping mouths openable and closable elastically to clamp the seat frames and mount the seat.

1 Claim, 3 Drawing Sheets

CONTRACTING STRUCTURE ON BICYCLE SEATS

BACKGROUND OF THE INVENTION

1. Field of the Invention

The present invention is related to a contracting structure of the seat on a bicycle, the structure can be assembled conveniently and fast, this is mainly pointed to mounting of the seats on bicycles, a seat can be pressed and engaged conveniently and fast for mounting on a lock head on the top end of a post pipe for the seat, efficiency of mounting can thus be increased.

2. Description of the Prior Art

Following advancing of automation science and technique, manufacturing and, assembling processes of many commodities in the markets mostly have eliminated manual operation mode, and take automatizational manufaturing machines and assembling machines having higher efficiency for production; take the business of bicycle production nowadays as an example, in the process of assembling the produced parts of a bicycle into a brandnew bicycle, requirement of manual work for assembling has been eliminated gradually, and many automata have been used instead for assembling bicycles one by one in predetermined locations or stations, however, in order to increase the efficiency of production during assembling of the parts of bicycles by using the automata, study and improvement for getting reasonable structural matching among the parts of bicycles is extremely necessary.

It has been known however, in assembling of the seats of the bicycles seen in the markets, a seat is mounted and locked on a post pipe on the body of a bicycle; while the bottom of the seat of the bicycle has originally formed with two seat frames having given gauge distance between themselves, so that a lock head provided on the top of the post pipe of the seat can be used to engage and lock them in positions; this mode of mounting two seat frames by the lock head is effected by using a clamper seat which is adjustable for contracting and can be one of various clamper seats, the clamper seats in the markets have a common characteristic, i.e., the two lateral ends of the clamper seat are formed with two clamping mouths to fix the seat frames, the space between the centers of two clamping mouths is just the given distance between the seat frames, in this way, the seat frames can be stably embedded and fixed to locate the seat in position; yet at least one of the two clamping mouths on the two lateral ends of the clamper seat received in the lock head shall be opened in order that at least a seat frame can be pressed into the clamping mouth, however, conventional open ends of the clamping mouths on the two sides of the clamper seat are all "opened laterally outwardly", while the space between the opened lateral ends will be larger than the space between the centers of two clamping mouths (that is just the given distance between the seat frames), so that when in mounting, the seat frames have to be pulled away to increase the space therebetween, and the opened lateral ends on the outer sides of the clamping mouths can thereby receive the seat frames therein, so that a trouble that the seat frames must be pulled away before engaging the seat frames is existed, and this more suits manual operation for assembling of, the seat, thereby trouble of low efficiency in production and cost waste as well as increasing of work hour etc. can be induced due to requirement of man work in assembling, yet it is also relatively highly difficult in practising the assembling work using automata to pull away the seat frames for receiving in the clamping mouths, operation cost of the automata is very wasteful; therefore, the motive of the present invention is to improve convenience of assembling work between the seat and the lock head of the post pipe of a bicycle to simplify the mounting work when in assembling with automata or man power.

SUMMARY OF THE INVENTION

The object of the present invention is to provide a mode of assembling of the seat of a bicycle by which a force in a normal direction can press directly the seat frames into engaging by the clamping mouths of the lock head.

To achieve the above mentioned object, the present invention is provided with the following characteristics:

Firstly, under the requirement that the space between the centers of two clamping mouths is just the given distance between the seat frames, two clamping-blocks having elastic contracting ability are provided between the two clamping mouths, and two outwardly bevelled surfaces are provided on the two clamping blocks at the locations corresponding to where the seat frames are to be pressed for locking, so that when the seat frames contact the outwardly bevelled surfaces under a force in a normal direction the two clamping blocks can be retracted to open the clamping mouths to allow the seat frames to be pressed and engaged therein.

Secondly: a bevelled pushing groove and two inwardly bevelled surfaces are provided respectively on the bottom of the clamper seat in the lock head and on the clamping blocks, and two contracting semi-circular annuli are provided in the lock head, the inner wall of each of the two arciform semi-circular annuli is formed to have a ridge having two-way bevelled stop surfaces with the identical pitch, thereby, when the lock head is contracted to reduce the diameter thereof, the contracting force can be transmitted via the wall of the groove in the lock head through the two-way bevelled stop surfaces of the two contracting semi-circular annuli and to the two inwardly bevelled surfaces of the clamping blocks and the bevelled pushing groove of the clamper seat, so that the clamping blocks tightly and outwardly engage simultaneously the seat frames in the clamping mouths, meantime, the clamper seat, the clamping blocks and the contracting semi-circular annuli are fixed tight, and stable contracting effect can be obtained after the seat frames are engaged.

The present invention will be apparent in its practical structure for obtaining the above stated objects and characteristics after reading the detailed description of the preferred embodiment thereof in reference to the accompanying drawings.

DETAILED DESCRIPTION OF THE PREFERRED EMBODIMENT

Figure 1:
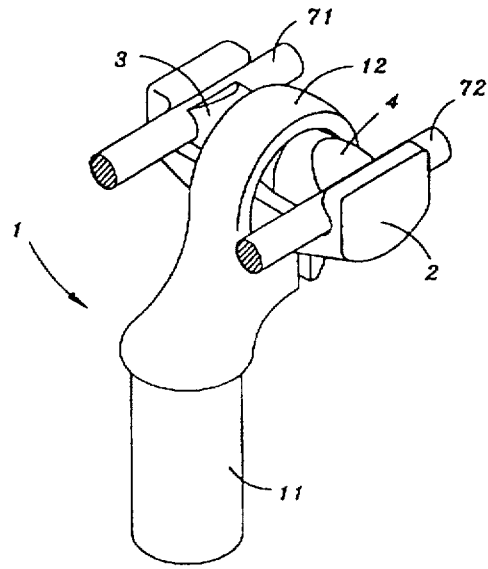
FIG. 1 is a perspective structural view of the present invention.
Figure 2:
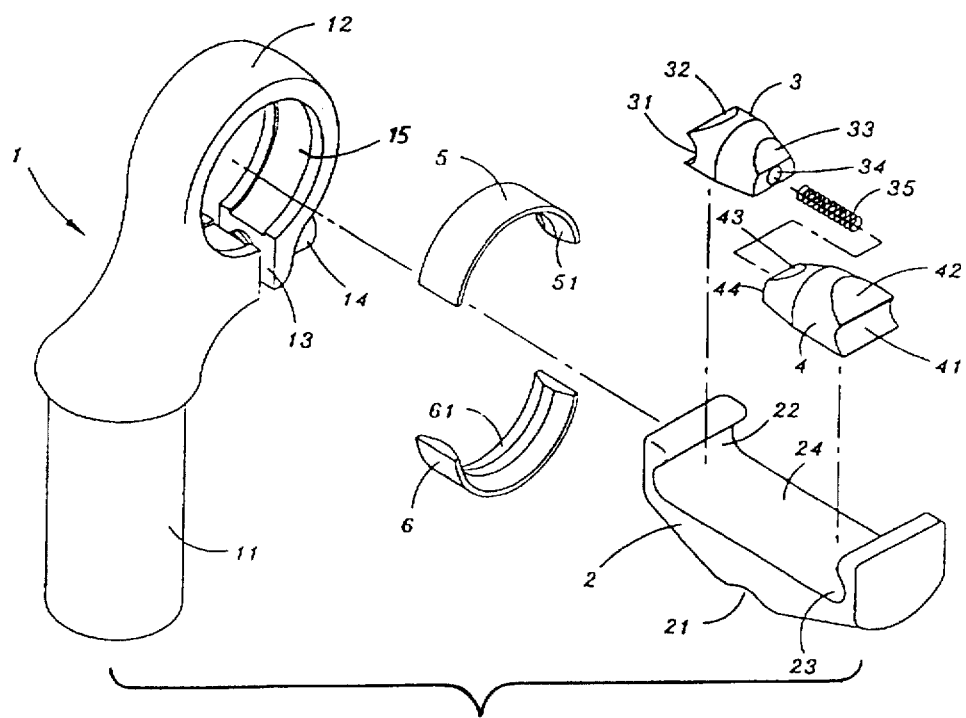
FIG. 2 is an analytic perspective view of the present invention.
Figure 3:
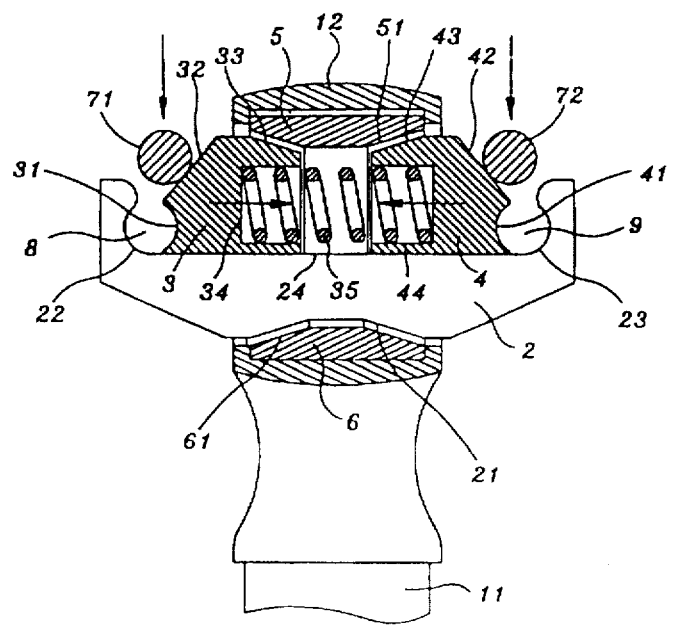
FIG. 3 is the first schematic sectional view showing engaging of the seat frames of the present invention.

Referring firstly to FIGS. 1 and 2, the present invention contracting structure having convenience of assembling for bicycle seat frames is comprised of a post pipe 1 for a bicycle seat, a clamper seat 2, two clamping blocks 3 and 4, two contracting semi-circular annuli 5 and 6 and the seat 7 (FIG. 6), wherein:

The post pipe 1 for the bicycle seat is formed as a smaller insertion pipe 11 on the bottom end thereof for inserting onto the bicycle body and securing thereon; the top end of the post pipe 1 is formed as a C shaped lock head 12, a clamping gap 13 is provided on one side of the lock head 12, a screw 14 is extended transversely through the clamping gap 13, so that the diameter of the C shaped lock head 12 can be reduced by screwing tight of the screw 14, moreover, a grooved inner wall 15 is formed in the lock head 12;

The two arciform semi-circular annuli 5 and 6 are engaged in the grooved inner wall 15 of the lock head 12, the inner wall of each of the two arciform semi-circular annuli 5 and 6 is formed to have a ridge having two-way bevelled stop surfaces 51 and 61;

The two arciform semi-circular annuli 5 and 6 receive the clamper seat 2 therebetween, the bottom of the clamper seat 2 is formed with a two-way bevelled pushing groove 21 for contact with the two-way bevelled stop surfaces 61 of the contracting semi-circular annulus 6; the two sides of the clamper seat 2 are formed with two arciform rod grooves 22, 23, the clamper seat 2 between the rod grooves 22, 23 has a base surface 24 for receiving the two clamping blocks 3 and 4;

The outer lateral sides of the two clamping blocks 3 and 4 are formed as two arciform clamping grooves 31, 41 corresponding respectively to the rod grooves 22, 23 of the clamper seat 2 to thereby form two clamping mouths 8 and 9 which can be opened-and closed for clamping two seat frames 71, 72 (as shown in FIG. 3); the top edges of the clamping grooves 31, 41 are provided respectively with outwardly bevelled surfaces 32 and 42 which form the pushing force bearing surfaces capable of bearing a pressing force and corresponding by position to the seat frames 71, 72 respectively; the inner lateral sides of the two clamping blocks 3, 4 are formed respectively with two inwardly bevelled surfaces 33 and 43 which exactly correspond by position to the upper lateral bevelled stop surfaces 51 of the upper arciform semi-circular annulus 5; the inner lateral sides of the two clamping blocks 3, 4 are provided with two spring grooves 34 and 44 in which a spring 35 is received, so that the lateral clamping grooves 31, 41 of the two clamping blocks 3, 4 can be adjustably moved to and fro relative to the two clamping mouths 8 and 9;

As to the seat 7, it is a conventional seat (refer to FIG. 6), the bottom thereof is mounted with the seat frames 71, 72 having a given distance therebetween to be pressed in a normal direction with respect thereto and engaged in the two clamping mouths 8 and 9 respectively for being fixedly locked therein for use.

Figure 4:
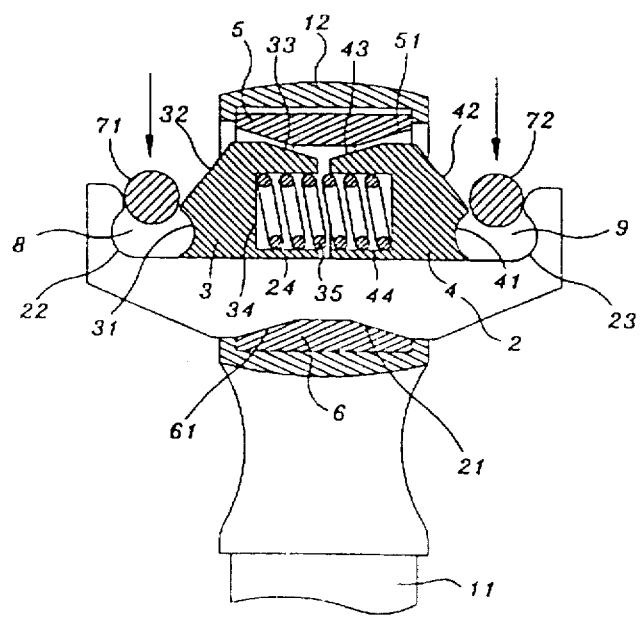
FIG. 4 is the second schematic sectional view showing engaging of the seat frames of the present invention.
Figure 5:
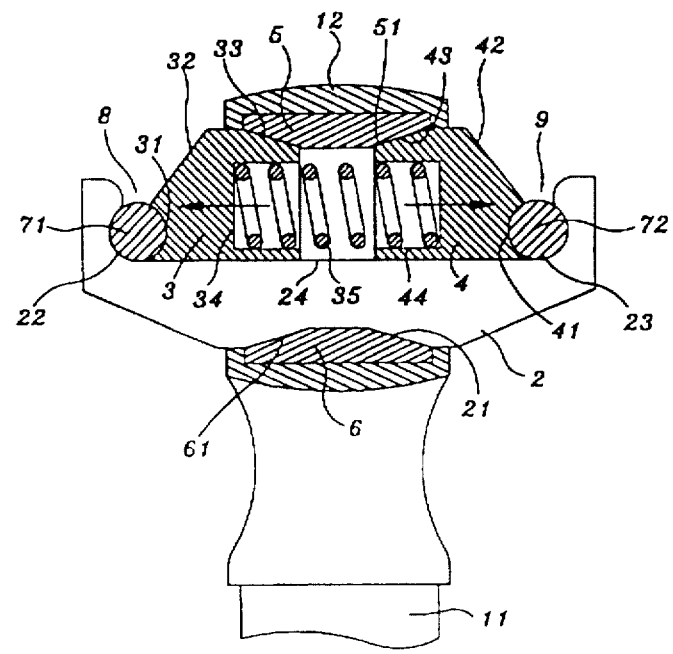
FIG. 5 is the third schematic sectional view showing engaging of the seat frames of the present invention.
Figure 6:
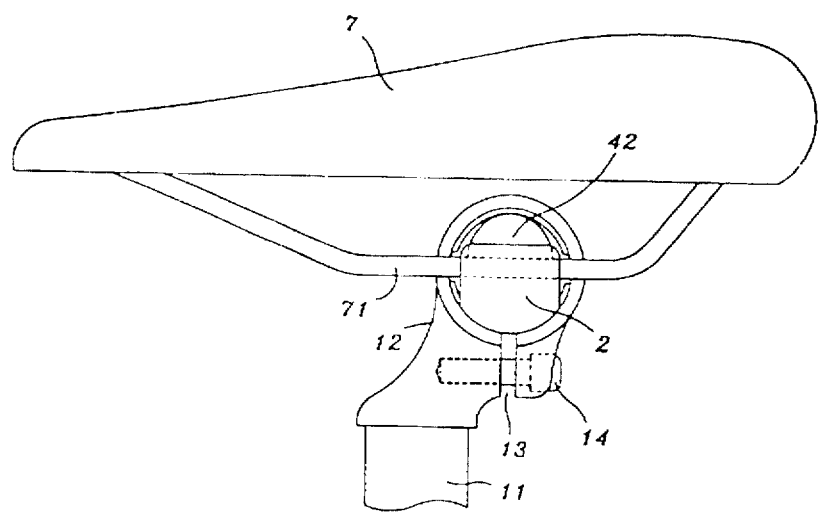
FIG. 6 is a side view showing the seat of the present invention has been mounted and locked.

By the above stated construction of members, before a pressing force in the normal direction is exerted to press and engage the seat frames 71, 72 at the bottom of the seat 7 in the two clamping mouths 8 and 9 respectively, the screw 14 on the lock head 12 is in a loosened state, the two arciform semi-circular annuli 5 and 6, the clamper seat 2 and the two clamping blocks 3, 4 are in a released state (as shown in FIG. 3), the seat frames 71, 72 having a given distance therebetween firstly contact and press the outwardly bevelled surfaces 32 and 42 of the two clamping blocks 3, 4 to retract the two clamping blocks 3, 4 (as shown in FIG. 4), now the spring 35 in the two clamping blocks 3, 4 is compressed, when the seat frames 71, 72 pare pressed and engaged in the two clamping mouths 8 and 9 respectively (as shown in FIG. 5), the two clamping blocks 3, 4 subjecting to the elastic restoring force of the spring 35 clamp and engage the seat frames 71, 72, this can get an object of fast and convenient engaging and mounting of the seat 7, then the screw 14 on the lock head 12 is screwed tight to contract diametrically the lock head 12, the contracting action is transmitted via the two-way bevelled stop surfaces 51, 61 of the contracting semi-circular annuli 5, 6 to the two sides of the inwardly bevelled surfaces 33 and 43 of the two clamping blocks 3, 4 and the two-way bevelled pushing groove 21, the clamping blocks 3, 4 therefore is forced to exert contracting force toward the two clamping mouths 8 and 9 to contract the seat frames 71, 72 (as shown in FIG. 5), the seat frames 71, 72 thus are fixed in position to lock the seat 7 as is shown in FIG. 6, the convenient mounting and locking operation of the seat 7 thus is completed.

Wherein, when the seat frames 71, 72 are pressed and engaged in the two clamping mouths 8 and 9 respectively, the tilting angle of the seat 7 can be adjusted before the screw 14 is screwed tight, and after suitable adjusting, the screw 14 is screwed tight to fix the seat 7.

The work of tightening the screw 14 for fixing the seat 7 is separately practised conventionally in a mass assembling factory from the engaging and mounting of the seat 7, these two stage of work are the two necessary steps for the contracting structure of the seat, however, what is provided in the present invention needs only a force in the normal direction to complete they assembling conveniently and fast in pressing and engaging of the seat for mounting, this is surely an improveness in mounting over the conventional messures, this can also reduce the operation cost no matter it is operated with an automaton or by manual work for mounting.

Having thus described the technical structure of my invention with practicability and improveness, therefore, what I claim as new and desire to be secured by Letters Patent of the United States is:

1. A contracting structure for a seat on a bicycle comprising:

a clamper seat, two clamping blocks and two contracting semi-circular annuli in a lock head on a post pipe of the bicycle seat, so that two seat frames at a bottom of said bicycle seat can be pressed and engaged by said clamper seat and said two clamping blocks;

said lock head includes a clamping gap through which a screw is extended, so that the diameter of said lock head can be reduced by tightening said screw, said lock head includes a grooved inner wall; and said two semi-circular annuli are arciform and are engaged in said grooved inner wall of said lock head, an inner wall of each of said two arciform semi-circular annuli is formed to have a ridge with bevelled stop surfaces;

sides of said clamper seat are formed with two arciform rod grooves, said clamper seat has a base surface for receiving said two clamping blocks between said rod grooves;

outer lateral sides of said two clamping blocks are formed as two arciform clamping grooves corresponding respectively by position to said two rod grooves of said clamper seat to thereby form two clamping mouths which can be opened and closed for clamping said two seat frames;

top edges of said clamping grooves are provided respectively with two outwardly bevelled surfaces which form pushing force bearing surfaces;

inner lateral sides of said two clamping blocks are formed respectively with two inwardly bevelled surfaces which correspond to an upper one of said bevelled stop surfaces of an upper said arciform semi-circular annuli;

inner lateral sides of said two clamping blocks are further provided with two spring grooves in which a spring is received, so that said clamping grooves of said two clamping blocks can be adjustably moved to and fro relative to said two clamping mouths; such that before a pressing force in a normal direction is exerted to press and engage said seat frames at the bottom of said bicycle seat in said two clamping mouths respectively, said seat frames having a given distance therebetween firstly contacts and presses said outwardly bevelled surfaces of said two clamping blocks to retract said two clamping blocks, now said spring in said two clamping blocks is compressed, when said seat frames are pressed and engaged in said two clamping mouths respectively, said two clamping blocks subjecting to the elastic restoring force of said spring clamp and engage said seat frames, then said screw on said lock head is screwed tight to contract said seat frames.

* * * * *